(12) United States Patent  
Berninger

(10) Patent No.: US 7,466,480 B2  
(45) Date of Patent: Dec. 16, 2008

(54) UV-BLOCKING FILTER COMPRISING A LAYER OF TEMPERATURE STABLE SILVER-CONTAINING DIFFUSION PAINT ON A BOROSILICATE GLASS BODY

(75) Inventor: Wolfgang Berninger, Waldaschaff (DE)

(73) Assignee: Schott AG, Mainz (DE)

( * ) Notice: Subject to any disclaimer, the term of this patent is extended or adjusted under 35 U.S.C. 154(b) by 234 days.

(21) Appl. No.: 11/232,652

(22) Filed: Sep. 22, 2005

(65) Prior Publication Data

US 2007/0242348 A1 Oct. 18, 2007

(30) Foreign Application Priority Data

Sep. 29, 2004 (DE) .............. 10 2004 047 104

(51) Int. Cl.
*F21V 9/06* (2006.01)
*G02B 5/20* (2006.01)

(52) U.S. Cl. ...................................... 359/361

(58) Field of Classification Search ............... 359/361
See application file for complete search history.

(56) References Cited

U.S. PATENT DOCUMENTS 4,870,034 A * 9/1989 Kiefer ................... 501/66
2002/0012155 A1 * 1/2002 Baumann et al. ............ 359/265
2002/0172830 A1 * 11/2002 Zirfas et al. ................. 428/434
2005/0270620 A1 * 12/2005 Bauer et al. ................. 359/265

FOREIGN PATENT DOCUMENTS

DE 2442879 3/1975
DE 10119124 4/2003

OTHER PUBLICATIONS

Schott Glaslexikon; Heinz G. Pfaender, 1997.
Schott: Glass Made of Ideas, Data Sheet, Nov. 12, 2007 (In English).
Schott Duran Produktions GMBH & Co. KG, Batch Certificate of Performance, Mar. 13, 2004 (In German and English).
Schmelzfarben GMBH: Safety Data Sheet, Aug. 12, 2007, pp. 1-6 (In English).

* cited by examiner

*Primary Examiner*—Joshua L Pritchett
(74) *Attorney, Agent, or Firm*—Michael J. Striker

(57) ABSTRACT

The UV-blocking filter is a disk-shaped glass body made of borosilicate float glass, which has a layer of silver-containing diffusion paint adhering to it, which blocks ultraviolet light, so that the UV-blocking filter resists a high thermal load up to temperature of about 500° C. The preferred borosilicate float glass has a composition, in percent by weight, of $SiO_2$, 81; $B_2O_3$, 13; $\Sigma\ Na_2O+K_2O$, 4; and $Al_2O_3$, 2. The preferred diffusion paint is a red-brown mordant, which contains 44.0 percent by weight of copper-II-sulfate-5-hydrate, 25.0 percent by weight $Ag_2O$, Fe, and Ba.

7 Claims, 1 Drawing Sheet

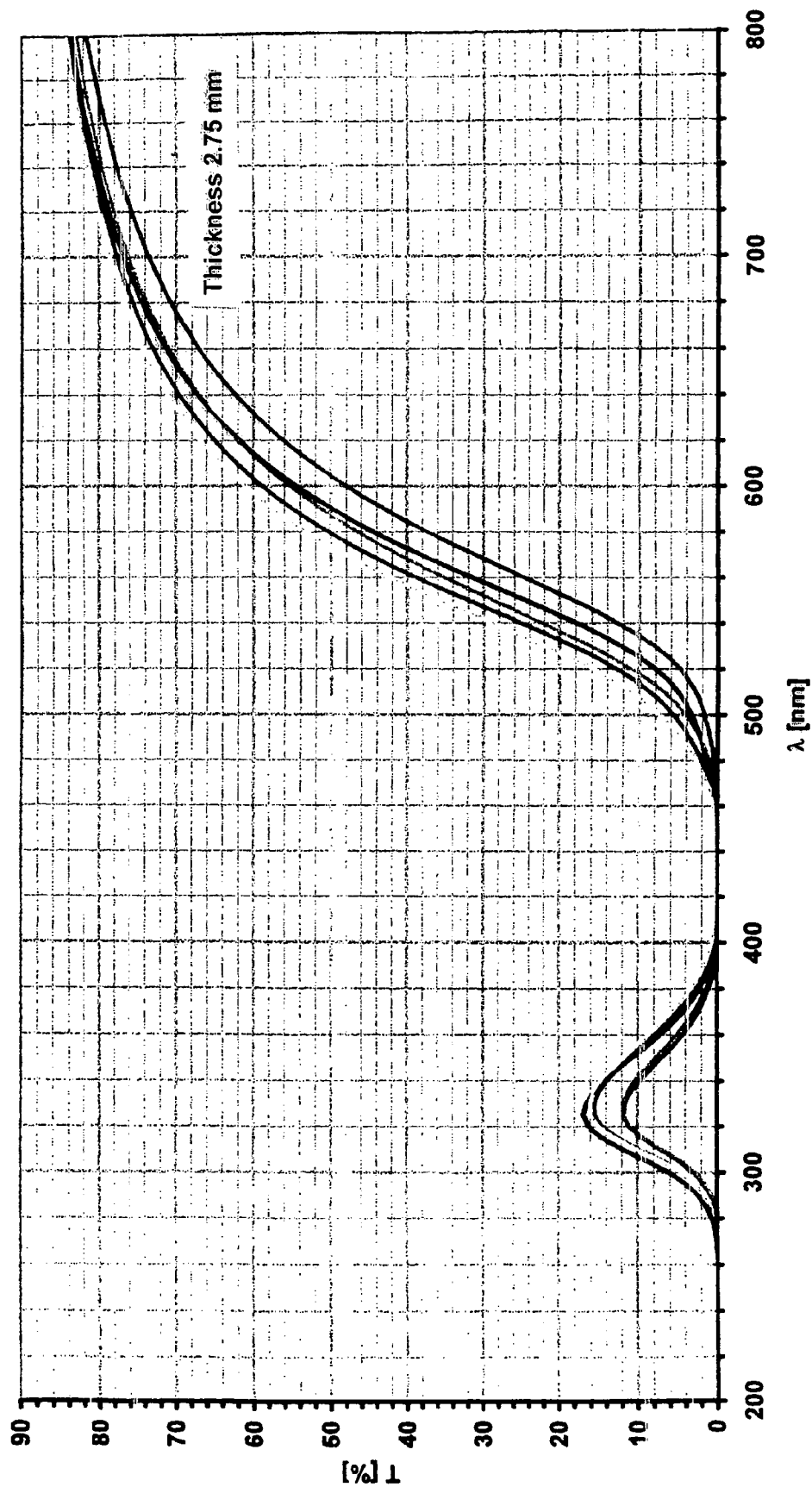

UV-BLOCKING FILTER COMPRISING A LAYER OF TEMPERATURE STABLE SILVER-CONTAINING DIFFUSION PAINT ON A BOROSILICATE GLASS BODY

BACKGROUND OF THE INVENTION

The present invention relates to a UV-blocking or cutoff filter, comprising a disk-shaped glass body, which is provided with paint or coloring that blocks ultraviolet radiation, but transmits visible light and infrared radiation.

This type of filter that blocks ultraviolet light (UV) is used in many different technical fields, for example in photography, but there are also industrial applications, for example in drying process with infrared light in automobile body repair shops.

It is known to make the above-described UV-blocking filter by coloring glass in the melt, forming a glass plate from the melt and cutting the filter out from the resulting glass plate. However the step of coloring the melt is very expensive and thus only economical in mass production.

It is also known to apply an ultraviolet blocking coating to a glass body for the filter with an appropriate coating process, for example a CVD method. However this sort of UV-blocking filter can only bear a thermal load to a limited extent.

SUMMARY OF THE INVENTION

It is an object of the present invention to provide a UV-blocking filter of the above-described type, which can withstand a thermal load up to temperatures of about 500° C.

This object and others which will be made more apparent hereinafter are attained in a UV-blocking filter comprising a disk-shaped glass body, which is provided with paint or a coloring substance that blocks ultraviolet light.

According to the invention the UV-blocking filter comprises a glass body made of borosilicate float glass and at least one layer of silver-containing diffusion paint coated on and adhering to the glass body.

The UV-blocking filter according to the invention comprises a core comprising a borosilicate glass disk, which is cut out from a conventional borosilicate float glass plate of standard thickness, e.g. a high quality borosilicate float glass marketed under the trademark BOROFLOAT® and having a composition, in percent by weight, of $SiO_2$, 81; $B_2O_3$, 13; $\Sigma$ $Na_2O+K_2O$, 4; and $Al_2O_3$, 2. The glass body of the UV-blocking filter is preferably made from this glass. The optical quality standards for the UV-blocking filter according to the invention are met by the very smooth surface of the borosilicate float glass, especially the BOROFLOAT® glass.

Furthermore the borosilicate glass is thermally highly loadable. For example, the borosilicate glass 3.3 has a linear thermal expansion coefficient of $3.3 \times 10^{-6}$/K, a transformation temperature, $T_g$, of 525° C. and a softening temperature, Ew, of 820° C.

The disk-shaped borosilicate glass body of the UV-blocking filter according to the invention is subsequently coated on at least one side with diffusion paint, also called "yellow mordant".

The diffusion paints are silver-containing paints, whose effective coloring ingredient penetrates the uppermost layers of glass on which it is applied by diffusion after application to the glass body. These paints color the glass body yellow to dark yellow to red-brown shades according to their compositions under formation of metal colloids, i.e. the silver ions of the diffusion paint diffuse into the glass surface and a strong bond is established between the diffusion paint and the borosilicate glass. The colored layers of diffusion paint have the same mechanical and chemical strength as the glass body itself. This type of diffusion paint can be supplied, for example, by
Dr. Kurt Rüger and Jos. F. Günzel,
Schmelzfarben GmbH
Posffach 262,
Dornhofstrasse 71,
6078 Neu-Isenburg,
Germany The product of the Schmelzfarben firm designated "Red-brown Etch" or "Red-brown Mordant" and type Nr. P 76 050, which produces a dark red-brown color when applied to a chemical apparatus glass, e.g. a glass, containing $SiO_2$, 81 wt. %; $B_2O_3$, 13 wt. %; $\Sigma$ $Na_2O+K_2O$, 4 wt. %; and $Al_2O_3$, 2 wt. %, which is marketed under the product name DURAN®, is especially advantageous for coating the borosilicate glass body of the UV-blocking filter according to the invention. The "red-brown mordant" of type Nr. P 76 050 contains 44.0 percent by weight of copper-II-sulfate-5-hydrate, 25.0 percent by weight $Ag_2O$, Fe and Ba according to product description sheets from the manufacturer.

The diffusion paint can be applied by screen printing, or manually with a brush or by a spraying process on the borosilicate glass body. Adjustment and dispersion behavior and selection of screen fabric during application by screen printing take place according to the technical information provided by the manufacturer of the diffusion paint and according to the experience of the worker applying the diffusion paint.

The applied diffusion paint is burned-in in a baking oven at temperatures of 580° C. to 620° C. with a sufficiently long holding time in this temperature range, so that a complete diffusion of the silver ions in the borosilicate glass occurs. The higher the temperature and the longer the holding time, the darker is the color shade of the paint.

BRIEF DESCRIPTION OF THE DRAWINGS

The sole FIGURE shows the dependence of light transmission in % on wavelength in nm for a UV filter according to the present invention, with paint layer thickness as parameter.

The advantages of the UV-blocking filter according to the invention comprise a borosilicate glass disk colored with the diffusion paint.

The paint blocks ultraviolet light (UV) and however is permeable to visible light and infrared radiation (IR). The associated transmission diagram, which shows the dependence of light transmission in % on the wavelength in nm for a given paint layer thickness as parameter for a borosilicate glass disk BOROFLOAT® of thickness 2.75 mm, which is coated with the above-described "red-brown mordant", makes it clear that the UV-blocking filter is substantially impermeable to light in a wavelength range of 400 to 460 nm but transmits a major portion of incident light and infrared radiation having wavelengths in a range greater than about 600 nm, independently of the number of applied paint layers.

The paint is acid-resistant and alkali-resistant.

The paint cannot be removed with abrasive means; the upper glass layers must be first removed (in a grinding process), in order to remove the paint.

The paint is temperature stable up to a temperature of 500° C.

The paint is stable to temperature change up to 250° C.

The service life of the UV-blocking filter is increased by many times.

The coated disk of the UV filter can be further worked by the conventional glass cold processing methods, such as grinding, faceting or drilling.

The burning-in process for the diffusion paint is considered the usual UV coating process in all types of applications or load situations according to the invention.

The UV-blocking filter can be used in many fields, especially where the surrounding temperatures are high.

The UV-blocking filter according to the invention finds applications, e.g. in auto body repair shops, where hardening processes occur with the help of UV light separately or in combination with drying processes performed with infrared light, in which areas must be shielded from UV radiation by a UV filter.

Very high working temperatures can be used in this repair work because the UV-blocking filter according to the invention can withstand very high temperature loads, whereby the repair times are very much shortened, which leads to advantageously shorter workplace idle times.

The disclosure in German Patent Application 10 2004 047-104.5-51 of Sep. 29, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a UV-blocking filter, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A UV-blocking filter consisting of
a disk-shaped glass body, and
a silver-containing diffusion paint layer coated on and adhering to said glass body;
wherein said glass body consists of a borosilicate float glass and the silver-containing diffusion paint layer comprises 44.0 percent by weight of copper-II-sulfate-5-hydrate and 25.0 percent by weight $Ag_2O$, Fe and Ba; whereby the filter is substantially light impermeable in a wavelength range of 400 to 460 nm, but transmits a major portion of incident light and infrared radiation having wavelengths greater than about 600 nm.

2. The UV-blocking filter as defined in claim 1, wherein said borosilicate float glass contains 81 percent by weight of $SiO_2$, 13 percent by weight of $B_2O_3$, 4 percent by weight of a sum of $Na_2O$ and $K_2O$, and 2 percent by weight of $Al_2O_3$.

3. The UV-blocking filter as defined in claim 1, wherein the borosilicate float glass has a linear thermal expansion coefficient of $3.3 \times 10^{-6}$/K, a transformation temperature, $T_g$, of 525° C., and a softening temperature, Ew, of 820° C.

4. The UV-blocking filter as defined in claim 1, wherein said silver-containing diffusion paint layer remains stable at temperatures up to 500° C.

5. A UV-blocking filter consisting of
a disk-shaped glass body, and a silver-containing diffusion paint layer coated on and adhering to said disk-shaped glass body, whose effective coloring ingredients penetrate adjacent regions of the glass body, on which the diffusion paint layer adheres, after the diffusion paint is burned-in in a baking oven at temperatures of 580 to 620° C. for a sufficiently long time interval;
wherein said glass body consists of a borosilicate float glass and said borosilicate float glass contains 81 percent by weight of $SiO_2$, 13 percent by weight of $B_2O_3$, 4 percent by weight of a sum of $Na_2O$ and $K_2O$, and 2 percent by weight of $Al_2O_3$, and
wherein the silver-containing diffusion paint layer comprises 44.0 percent by weight of copper-II-sulfate-5-hydrate and 25.0 percent by weight $Ag_2O$, Fe and Ba; whereby the filter is substantially light impermeable in a wavelength range of 400 to 460 nm, but transmits a major portion of incident light and infrared radiation having wavelengths greater than about 600 nm.

6. The UV-blocking filter as defined in claim 5, wherein the borosilicate float glass has a linear thermal expansion coefficient of $3.3 \times 10^{-6}$/K, a transformation temperature, $T_g$, of 525° C., and a softening temperature, Ew, of 820° C.

7. The UV-blocking filter as defined in claim 5, wherein said silver-containing diffusion paint layer remains stable at temperatures up to 500° C.

* * * * *